United States Patent [19]
Joffe et al.

[11] 4,441,022
[45] Apr. 3, 1984

[54] COATING THICKNESS MEASURING DEVICE

[75] Inventors: Boris B. Joffe, Buffalo; Jerry J. Spongr, Tonawanda; Byron E. Sawyer, North Tonawanda, all of N.Y.

[73] Assignee: Twin City International Inc., Amherst, N.Y.

[21] Appl. No.: 257,975

[22] Filed: Apr. 27, 1981

[51] Int. Cl.³ .......................................... G01N 23/00
[52] U.S. Cl. .................................................. 250/308
[58] Field of Search ................. 250/308, 358.1, 359.1, 250/360.1; 378/89

[56] References Cited
U.S. PATENT DOCUMENTS
4,190,770  2/1980  Saunders et al. ................. 250/308

*Primary Examiner*—Davis L. Willis
*Attorney, Agent, or Firm*—Christel, Bean & Linihan

[57] ABSTRACT

A device especially adapted for measuring the thickness of coatings on small, complexly-shaped parts, such as, for example, electronic connectors, electronic contacts, or the like. The device includes a source of beta radiation and a radiation detector whereby backscatter of the radiation from the coated part can be detected and the thickness of the coating ascertained. The radiation source and detector are positioned in overlying relationship to the coated part and a microscope is provided to accurately position the device with respect to the part. Means are provided to control the rate of descent of the radiation source and radiation detector from its suspended position to its operating position and the resulting impact it makes with the coated part to thereby promote uniformity of readings from operator to operator, and also to avoid excessive impact with the part, thereby improving accuracy of measurement and eliminating damage to the parts.

22 Claims, 10 Drawing Figures

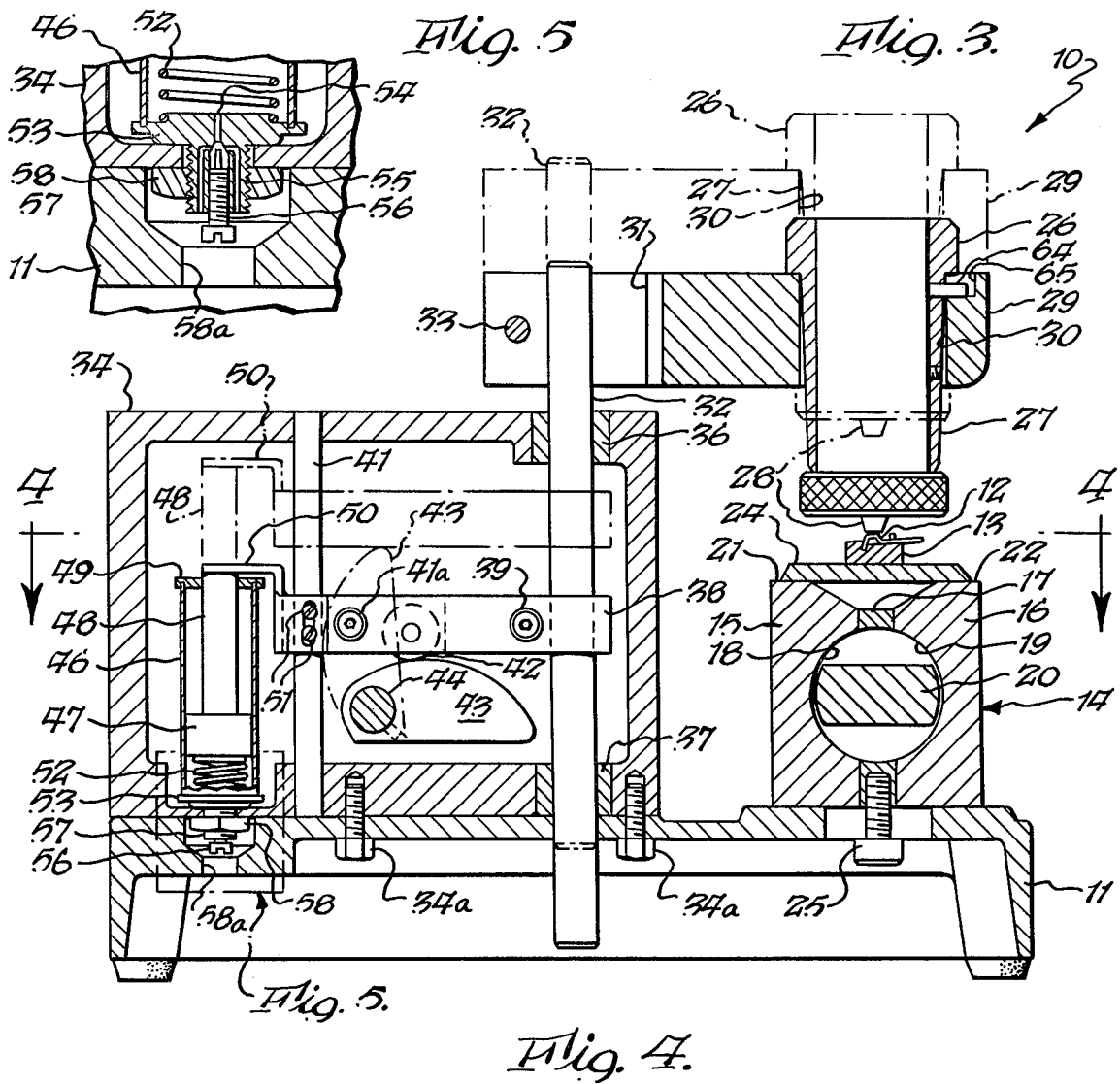
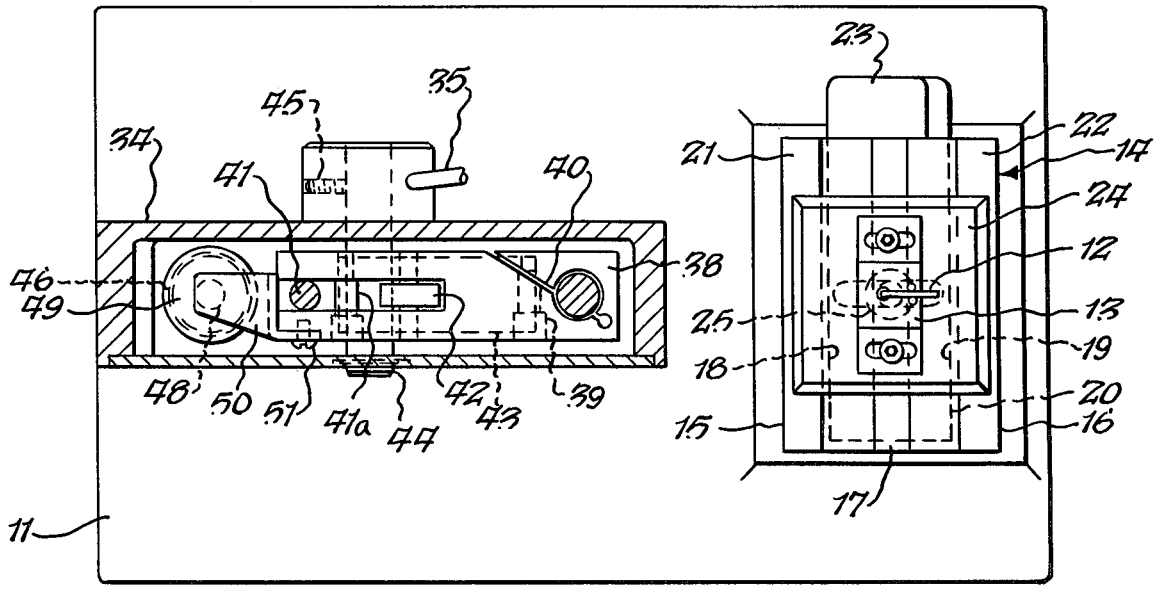

COATING THICKNESS MEASURING DEVICE

BACKGROUND OF THE INVENTION

This invention relates generally to coating thickness measuring devices, and more particularly to an improved coating thickness measuring device utilizing radiation, such as beta backscatter, for the measurement of coating thicknesses, and is especially suitable for use with small electronic connectors and in other applications where small parts include thin coatings, the thickness of which must be accurately measured.

Various types of coatings are commonly applied to small electronic parts such as connectors, contacts for connectors, and the like. Because if the critical nature of the coating thickness in such applications, it is necessary that the thickness be determined with a high degree of precision. The use of beta radiation backscatter has been found to provide the necessary degree of precision required for the accurate measurement of such thicknesses. As a consequence, several devices have been developed to apply the beta radiation backscatter technique to the measurement of coating thicknesses on various types of electronic parts, such as, for example, on printed circuit boards, and also in other applications. For example, U.S. Pat. No. 3,529,158 shows one type of portable probe in which a base member receives a guide for aligning the member with the area to be measured, the guide then being removed from the member and replaced by a measuring head. U.S. Pat. No. 3,720,833 shows another type of portable probe in which a spring biased locator carried by the probe housing is retracted within the housing by a cam arrangement in response to the lowering of a measuring probe unit into engagement with the workpiece.

Most frequently, the devices which have been developed and commercially marketed involve the manual positioning of the sensing element with respect to the part to be measured. Where extremely small and fragile parts are involved, such as very small connectors or contacts for connectors, it is possible for an unskilled operator of such a measuring device to bring excessive force to bear between the sensing head and the part being measured, with a possible result that the part itself is in some way deformed or damaged or, because of varying contact pressures between the sensing element and the parts from one operator to another, inconsistent readings are obtained.

It is an object of the present invention to overcome the above-described shortcomings of the prior art devices and to provide an improved coating thickness measuring device incorporating a radioactive isotope source and detector and which is adapted to prevent damage to the parts being measured and also to permit repeatable, accurate readings indicative of the coating thickness, which readings are consistent and are independent of the skill and care exercised by the operator.

It is a further object of the invention to provide an improved positioning arrangement by means of a part positioning fixture in which the part can be readily and accurately positioned relative to the probe, so that once the device is set up, parts of the same configuration can be rapidly measured without the need to individually reposition each part for measurement.

SUMMARY OF THE INVENTION

Briefly stated, in accordance with one aspect of the present invention, a coating thickness measuring system is provided which includes a base and means carried on the base for accurately positioning a part for the measurement of coating thickness. A radiation source is carried by the device, and a radiation detector is provided to measure the amount of backscatter, which is then correlated with the thickness of the coating being measured. The radiation source and the radiation detector are carried in a probe which includes an aperture which is brought into close proximity with the area of coating thickness to be measured. The probe is releasably carried by the device for positioning over the part to be measured and is adapted to be brought into contact with the coated surface by means of gravity so that the aperture is over the area to be measured. Means are provided for controlling the rate of descent of the system so as to provide uniform and controlled contact with the surface being measured, in order to facilitate uniformity and accuracy of measurements from part to part.

BRIEF DESCRIPTION OF THE DRAWINGS

FIG. 3 is a cross-sectional view taken along the line 3—3 of FIG. 2 showing the probe in contact with a part, the coating thickness of which is to be measured.

FIG. 4 is a cross-sectional view taken along the line 4—4 of FIG. 3 illustrating a positioning fixture which can be employed with the present invention and showing the interior of the probe guide housing.

FIG. 5 is an enlarged, fragmentary, cross-sectional view of a portion of the arrangement utilized in the present invention to control the rate of descent of the probe and its impact with the part and is an enlargement of the area identified as "FIG. 5" in FIG. 3.

DESCRIPTION OF THE PREFERRED EMBODIMENTS

Figure 1:
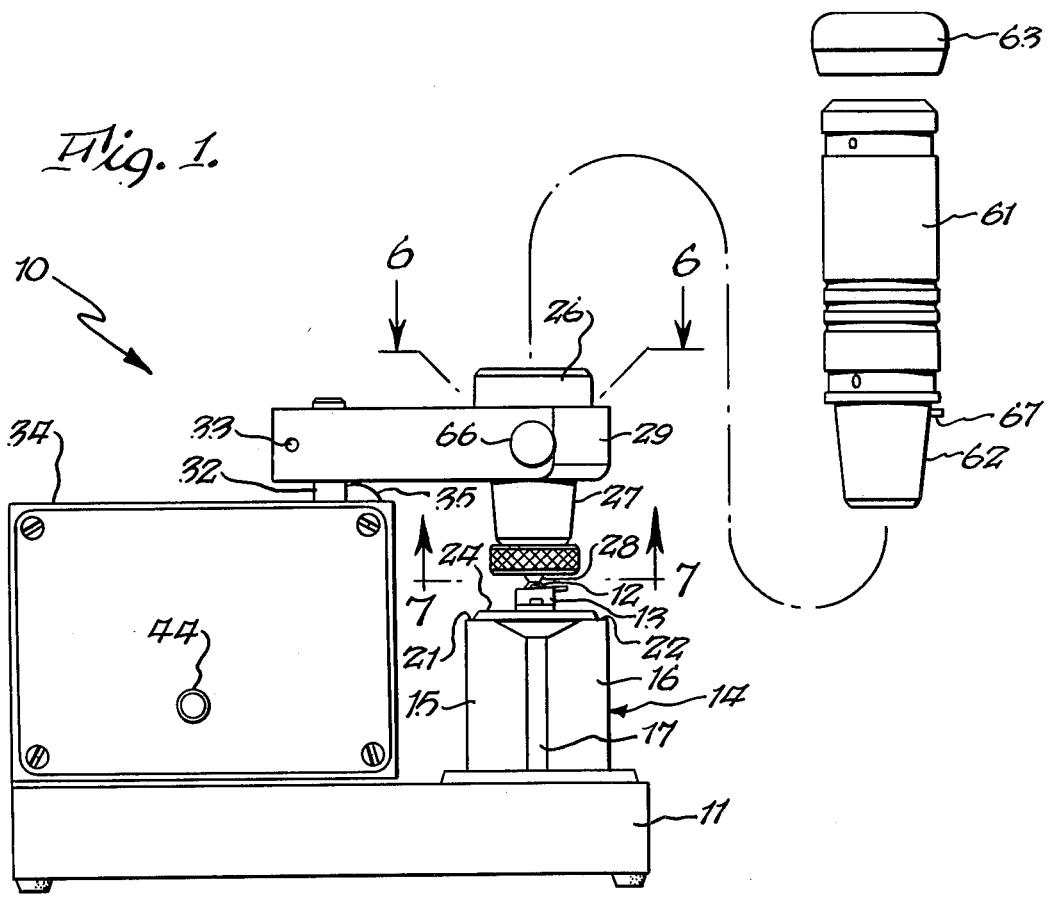
FIG. 1 is a side elevational view of a coating thickness measuring system according to the present invention and incorporating a measuring probe.
Figure 2:
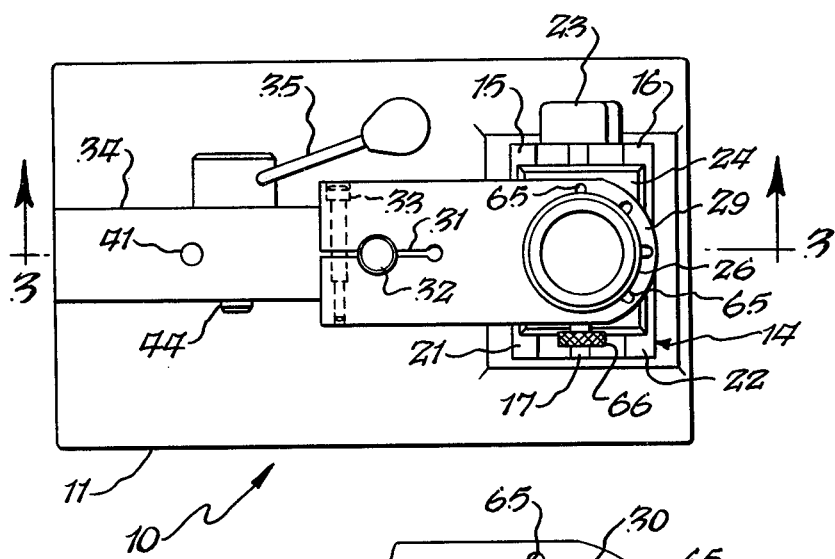
FIG. 2 is a top plan view of the device shown in FIG. 1.

Referring now to the drawings, and particularly to FIGS. 1 and 2 thereof, there is shown a measuring device 10 according to the present invention and which includes a base 11 on which the several elements of the device are positioned and supported. A coated part 12, the coating thickness of which is to be measured, can be held in a predetermined position by means of a positioning fixture 13. Positioning fixture 13, as illustrated, is especially configured and adapted for use with a particular shape and design of part. Alternatively the fixture is can be a universal-type holder which can be adjusted to accommodate parts having various different configurations. An example of such a universal-type holding fixture is shown in co-pending application Ser. No. 151,785, filed May 21, 1980, entitled, "Positioning Fixture For Measuring Instruments," and owned by the assignee of the present invention, now U.S. Pat. No. 317,997.

Positioning fixture 13 can be securely held in a fixed position by means of a magnetic holder 14, which consists of a pair of magnetically permeable elements 15, 16 separated by a spacer 17 of non-magnetically permeable material. As shown more clearly in FIG. 3, each of magnetically permeable elements 15, 16 includes a hollowed-out portion 18, 19, respectively, within which a permanent magnet 20 is rotatably positioned. Magnetically permeable portions 15, 16 include flat and coplanar top surfaces 21, 22, respectively, upon which the positioning fixture can be placed. The angular position of permanent magnet 20 within the hollowed-out portions 18, 19 is varied manually by means of a knob 23 as shown more clearly in FIGS. 2 and 4. When permanent magnet 20 is in the position shown in FIG. 3 the magnetic lines of force pass through the base 24 to which positioning fixture 13 is attached. When base 24 is made from a magnetically permeable material, positioning fixture 13 is securely held in the position in which it was placed before magnet 20 was rotated to the position shown in FIG. 3. When magnet 20 is rotated 90°, into a vertical position, the magnetic lines of force are confined within magnetic holder 14 and permit positioning fixture 13 to be readily removed. Magnetic holder 14 is preferably rigidly secured to base 14 as, for example, by means of one or more bolts 25.

In addition to a magnetic holder 14 as shown, other holding means can also be provided, such as, for example, a conventional "X-Y" slide (not shown), which is essentially a pair of horizontal slide members which are vertically spaced and are adapted to be movable along mutually perpendicular directions to permit positioning at any particular point within the range of motion of the device and provide accurate positioning of parts carried thereby. The slide carries means for holding a part to be measured, which can, for example, be a vise, or other suitable part holding means.

Referring now to FIGS. 1 and 3, positioned above positioning fixture 13 is a measuring head or probe 26 which can include a downwardly and inwardly tapered body 27, at the lower end of which is interiorly positioned a beta radiation isotope source (not shown) in an apertured source holder 28. Above the radiation source there is positioned within probe 26 a radiation detection means (not shown), which can be, for example, a standard Geiger-Muller tube for detecting radiation backscatter. The output of the Geiger-Muller tube can be connected to a suitable display device (not shown), which can be a standard meter of known type, or, if desired, it can be a direct digital readout, as will be readily understood by those skilled in the art. Probe 26 is carried in a mount 29, which can include a downwardly and inwardly tapered, probe-receiving bore 30, and which also includes a split-ring arrangement 31 (see FIG. 2) for securing mount 29 to a supporting column 32 by means of a bolt 33. Although body 27 and bore 30 are shown and described in terms of a downward and inward taper, a non-tapered body and cylindrical bore can also be used.

Supporting column 32 is adapted to be slidably carried in a housing 34, which is secured to base 11, as by means of bolts 34a (see FIG. 3). An operating handle 35 is rotatably supported in housing 34 and is adapted to move supporting column 32, mount 29, and probe 26 upwardly, in a direction away from the part to be measured, when handle 35 is moved in an upward and rearward direction. When the handle is moved towards the operator and downwardly, supporting column 32 mount 29, and probe 26 also move downwardly, in a direction toward the part, so that probe 26 comes into contact with the part to be measured.

Referring now to FIG. 3, it can be seen that supporting column 32 is slidably positioned in a pair of spaced, coaxial sleeve bearings 36, 37 which are carried in a housing 34. Supporting column 32 is constrained to move vertically to bring mount 29 and probe 26 into and out of contact with the part to be measured. A guide block 38 is clampingly attached to supporting column 32 as by means of the bolt 39 and split-ring arrangement 40 shown more clearly in FIG. 4. Guide block 38 is slidably carried on guide shaft 41, which is spaced from supporting column 32 so as to prevent rotation of guide block 38 about the axes either of supporting column 32 or of guide shaft 41. A roller-type cam follower 42 is rotatably carried in guide block 41 and a cam 43 is provided to engage with cam follower 42. Cam 43 is secured to shaft 44, which is rotatably carried in housing 34 and an operating handle 35 is secured thereto by means of set screw 45. The configuration of cam 43 is such that rotation of cam 43 counterclockwise about the axis of shaft 44 causes the cam to push cam follower 42, and thereby guide block 38, upwardly from the lowermost position as shown by solid lines in FIG. 3. Cam 43 is brought downward by means of forward and downward movement of operating handle 35, and is raised by means of upward and rearward movement of operating handle 35.

Also positioned within housing 34 is a means to control the rate of descent of probe 26, to thereby control the impact force which source holder 28 makes with coated part 22, the coating thickness of which is to be measured. As shown, the control means provided includes a cylinder 46 within which a piston 47 is slidably positioned. A piston rod 48 extends from one side of piston 47 in an upward direction through the top portion 49 of cylinder 46, and is in contact with an outwardly-extending bracket 50 attached to guide block 38, as by means of screws 51. A compression spring 52 is provided on the side of piston 47 opposite that from which piston rod 48 extends so as to urge piston 47 and piston rod 48 in the upward direction.

At the lower end of cylinder 46 is a valve and aperture arrangement which is shown more clearly in FIG. 5. As shown, a cylinder base 53 is provided which serves to close the lower end of cylinder 46. Cylinder base 53 includes an aperture 54, which communicates with the area outside the base of the device by means of a passageway 55. A needle valve 56 is rotatably positioned in cylinder base 53 and is adapted for rotation toward and away from aperture 54 to vary the effective flow area thereof, to thereby control the rate of flow of air from cylinder 46 between piston 47 and cylinder base 53 as piston 47 is forced downwardly, and thereby control the rate of descent of supporting column 32, mount 29, and probe 26. Cylinder base 53 includes an annular neck portion 57 which carries an external thread to engage with a securing nut 58 to firmly attach cylinder 46 to housing 34. Aperture 58a is provided in base 11 to permit access to needle valve 56 for purposes of adjustment.

Instead of the pneumatically operated piston-cylinder arrangement described above to control the rate of descent of supporting column 32, mount 29, and probe 26, a hydraulic arrangement could also be employed. Moreover, if desired, a frictional system can be provided. Such a frictional system could involve selectively varying the clamping force applied between guide block 38 and guide shaft 41, as by suitably adjusting bolt 41a.

Figure 7:
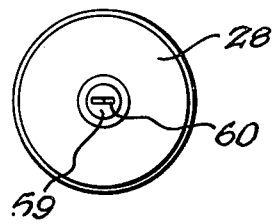
FIG. 7 is a view taken along the line 7—7 of FIG. 1 and shows the aperture in the probe which is brought into contact with the coated surface.

At the lowermost end of probe 26 is positioned conical radiation source holder 28, which includes a flat lower surface 59 through which an aperture 60 of predetermined configuration is provided, as shown in FIG. 7. Although an aperture having a rectangular cross section is shown, a circular aperture can also be provided, as can apertures of other shapes.

As was hereinabove pointed out, probe mount 29 can include a downwardly and inwardly tapering inner bore 30, which serves to accurately position probe 26 and source holder 28 so that aperture 60 is centrally located with respect to bore 30. Alignment of the axis of aperture 60 with the coated area of the part to be measured is provided by means of a microscope 61 shown in FIG. 1. To carry out the alignment, probe 26 is removed from mount 29 and microscope 61, which also can include a downwardly and inwardly tapered lower portion 62 to cooperatively engage with tapered bore 30, is thereby centrally positioned in bore 30 of mount 29. An eyepiece cover 63 can be provided to protect the eyepiece of the microscope. Preferably, microscope 61 includes a centrally positioned cross-hair for aligning the desired area of the part to be measured with the central axis of bore 30 so that when microscope 61 is removed from mount 29 and probe 26 is replaced therein, aperture 60 directly overlies the area to be measured. To facilitate the placement of positioning fixture 13 with respect to the central axis of bore 30 and the area to be measured, a line or lines can be inscribed on positioning fixutre 13 to correspond to the position where the measurement is to be taken when a part is placed on the fixture. Thus, microscope 61 is positioned in mount 29 and is brought into close relationship with positioning fixture 13 so that one line of the cross-hair of microscope 61 can be aligned with an inscribed line or lines on positioning fixture 13, or the sighting can be made directly on the part itself. When that alignment step has been accomplished, magnet 20 within magnetic holder 14 is rotated so that the magnetic lines of force pass through base portion 24 of positioning fixture 13 and thereby serve to rigidly hold it in the desired position for measurement.

After positioning fixture 13 has been accurately placed with respect to the axis of bore 30 to permit measurement of the coating thickness, a part is placed on positioning fixture 13 and operating handle 35 is caused to be moved downwardly, toward the operator. When the operating handle is so moved, cam 43 rotates from the position shown in dashed lines in FIG. 3 to the position shown in solid lines and shaft 32, mount 29, and probe 26 are caused to move from the position shown in dashed lines to that shown in solid lines. The rate of descent of the entire assembly, including probe 26, is controlled by rotating needle valve 56. When the desired rate of descent, and thus the desired impact force, has been achieved, usually by several trails, the device is ready for measuring any number of parts adapted to be held by the particular positioning fixture which is in place. The contact force between source holder 28 and part 13 is uniform from one part to the other and is not affected by the speed with which the operator moves operating handle 35, thereby providing uniform, repeatable measurements which are independent of the individual skills or abilities of the particular operator involved. In the embodiment shown in FIGS. 3 and 4, positioning fixture 13 is shown being of a type which is adapted to receive a complexly-shaped electronic connector which has had a coating applied thereto, the connector in this instance having an arcuate surface to which the coating has been applied. As can be appreciated, the device of the present invention provides repeatability between readings taken from the same part and also between readings taken from part to part.

Figure 6:
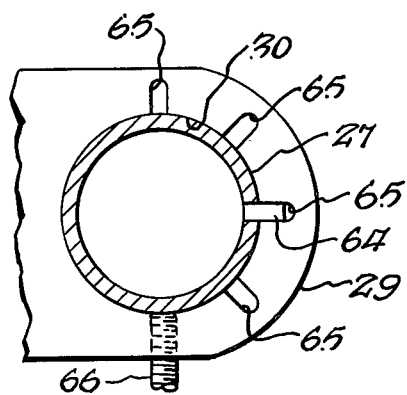
FIG. 6 is an enlarged, fragmentary view of the mount which carries the probe, taken along the line 6—6 of FIG. 1 and illustrating an indexing arrangement provided to permit rotational indexing of the probe.

In the event it is desired to change the orientation of slot 60 with respect to holder 29, probe 26 can be provided with a radially positioned indexing pin 64 which fits into one of slots 65 formed in the upper surface of holder 29 as shown in FIG. 6. As shown, four radial slots 65 can be provided which extend outwardly from bore 33 and along the top surface of holder 29, each of the slots being spaced at 45° intervals to permit indexing of probe 26 over a range of 135° in 45° increments. Probe 26 can be restrained in a particular slot 65 by means of set screw 65. As best seen in FIG. 1, a similar type of indexing pin 67 can be provided in microscope 61.

Figure 8:
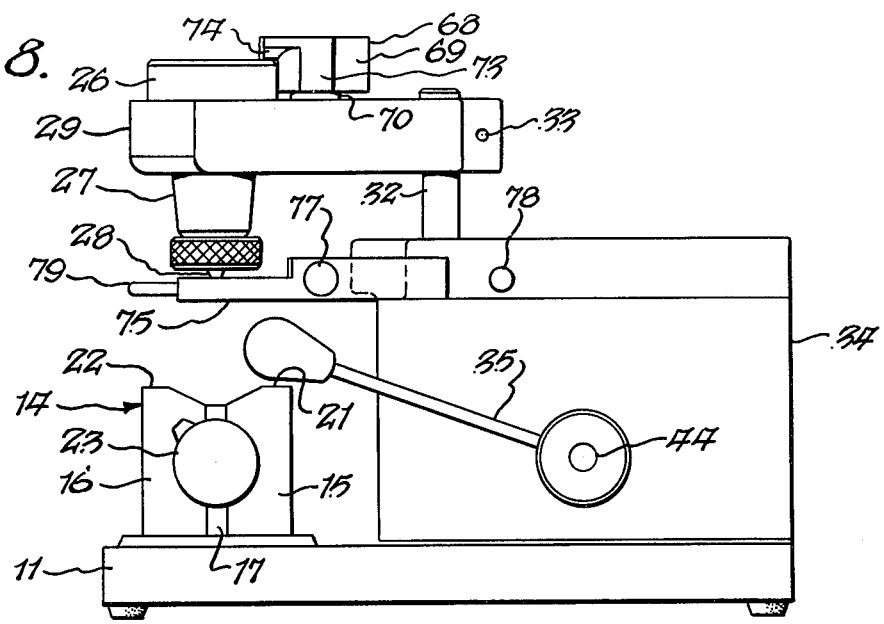
FIG. 8 is a right side elevational view of another embodiment of the invention and which includes means to secure the probe in position and calibration means carried by the device.
Figure 9:
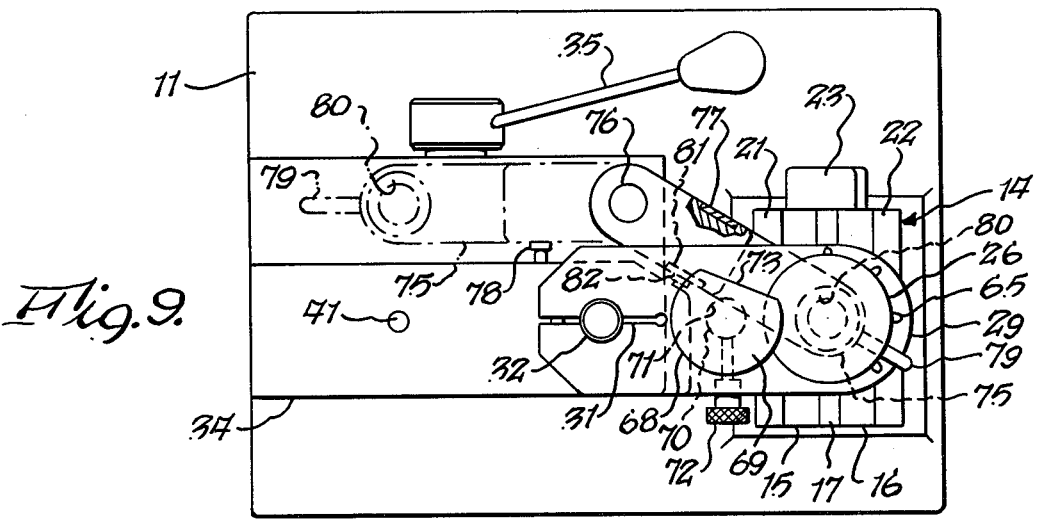
FIG. 9 is a top view of the embodiment of FIG. 8 showing the calibration means both in and out of calibrating position.
Figure 10:
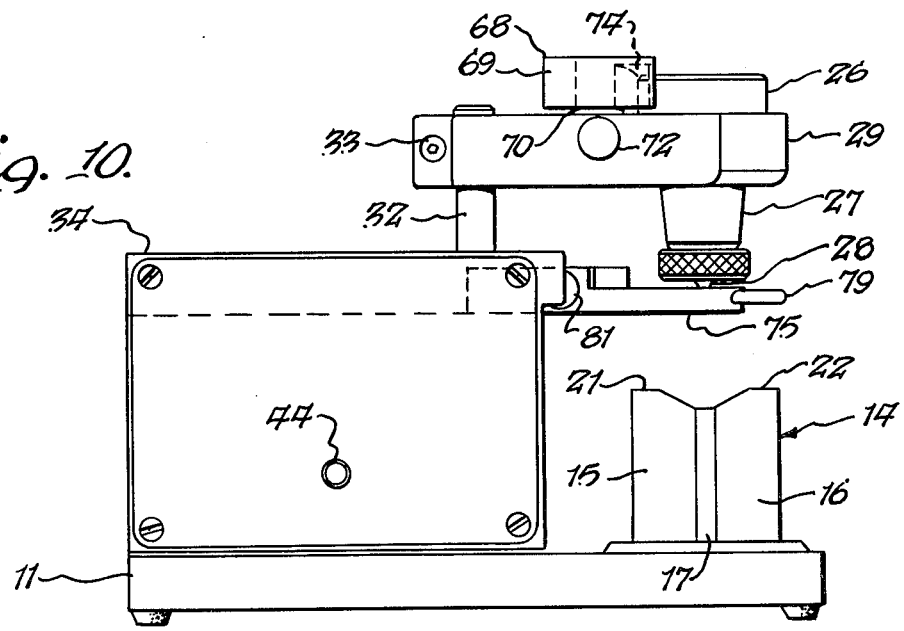
FIG. 10 is a left side view of the embodiment of FIG. 8 with the calibrating means in calibration position.

Referring now to FIGS. 8, 9, and 10, there is shown another embodiment of the invention which includes means for securing probe 26 in mount 29 and means for calibrating the device, the calibration means being carried by the device itself.

The probe securing means includes a probe lock 68 which is rotatably carried in mount 29. Probe lock 68 includes an upper body portion 69 and a depending stub shaft 70, which is received in aperture 71 in mount 29. A stop screw 72 is provided to secure probe lock 68 in the desired vertical position yet permit it to be rotatable by engaging a circumferential groove (not shown) in stub shaft 70. As best seen in FIG. 9, upper body portion 69 is of generally circular shape and is so positioned that it partially overlies a portion of the top of probe 26 to prevent upward movement thereof. A flat area 73 is provided so that probe lock 68 can be rotated to a position in which it does not overlie probe 26 in order to permit removal thereof from mount 29. Additionally, an inclined, circumferential cam 74 is provided in upper body portion 69 of probe lock 68 to permit gradual engagement with the top of probe 26 when lock 68 is rotated into locking position.

The embodiment of FIGS. 8–10 also includes a calibration arm 75 which is pivotally carried by housing 34. Referring to FIG. 9, calibration arm 75 swings horizontally about pivot 76 from a first, non-calibrating position shown in dashed lines to a calibrating position shown in full lines. While in the non-calibrating position arm 76 is out of the measurement zone and is held against the side of housing 34 by means of a magnet 77 positioned on an edge of arm 75 and cooperable with a magnetically permeable, adjustable stop member 78. Arm 75 includes a finger grip 79 for rotating it into calibrating position and a recesed specimen receptacle 80 for receiving a test specimen having a known coating thickness. When arm 75 is rotated into calibration position specimen receptacle 80 is positioned directly below source holder 28 so that the aperture therein overlies the coated area of the specimen. Arm 75 includes a magnet 81 in its other edge, which magnet is cooperable with another magnetically permeable, adjustable stop member 82 to hold arm 75 in position while a calibration reading is being taken. Although disclosed in terms of the use of magnets, other arm holding means could also be employed utilizing springs, clips, and the like, as will be appreciated by those skilled in the art.

Calibration of the device can also be accomplished by separate calibration means involving providing samples having a known thickness of the coating, individually positioning them on fixture 13, and then taking a reading. By utilizing different samples each of which has a different thickness, a calibration can be determined for the device, as will be appreciated by those skilled in the art. If desired, calibration can also be effected by removing probe 26, inverting it, and placing samples having a known coating thickness against source holder 28 and then taking a reading.

As can be seen from the foregoing description, the present invention provides an improved coating thickness measurement device for accurately measuring the thickness of thin coatings, particularly on small, fragile, and complexly-shaped parts. However, it should be noted that the utility of the present invention is not limited to such small parts and it can also be applied to larger parts, if desired. The impact force between the source holder and the part to be measured is controlled by a piston-cylinder arrangement and is independent of the skill, or lack of it, of the particular operator of the device. Thus it can be seen that more repeatable readings and more accurate readings result, as well as fewer parts rejects because of damage caused by unskilled or careless operators.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. A coating thickness measuring device for measuring the thickness of coatings applied to parts, said device comprising:

a base;

positioning means on the base for receiving and positioning a part having a coating thereon, the thickness of which is to be measured;

a probe provided with a radiation source and a radiation detector and having an aperture through which radiation can pass;

supporting means carried by said base and capable of supporting said probe for movement between a raised position wherein the aperture of said probe is generally vertically spaced above a part carried by said supporting means and a lowered operative position wherein said probe is disposed with said aperture in overlying relationship on said part in order to provide radiation backscatter therefrom, said probe being capable of sensing said radiation backscatter when in said operative position and providing a suitable output signal indicative of the thickness of the coating;

moving means which are capable of moving the probe between the lowered operative position and the raised position and further being capable of permitting the probe to descend from the raised position to its lowered operative position; and means for controlling the rate of descent of said probe upon release from its raised position so that the impact force of said probe on the part is uniform from part to part when it attains its lowered operative position.

2. The coating thickness measurement device of claim 1 wherein said supporting means includes an inwardly and downwardly tapering bore to accurately position said probe.

3. The coating thickness measurement device of claim 2 wherein said device includes means to receive a microscope in said bore for positioning a part so that the area to be measured is below said aperture when said probe is in operating position.

4. The coating thickness measurement device of claim 2 wherein said device includes a positioning fixture for accurately positioning a coated part to be measured whereby the coated surface thereof is positioned in underlying relationship with the central axis of said bore.

5. The coating thickness measurement device of claim 4 wherein said positioning fixture carries a marking indicative of the position of the coated area of the part the thickness of which is to be measured, so that the fixture can be accurately located with respect to said bore for accurate measurement.

6. The coating thickness measurement device of claim 1 wherein said device includes a cam which is movable from a rest position to an operating position, said cam being adapted to raise said probe out of contact with the surface of the part to be measured to said raised position and to selectively permit said probe to fall by means of gravity from said raised position to said lowered operative position wherein it is in contact with the part to be measured.

7. The coating thickness measurement device of claim 6 wherein the means for controlling the rate of descent of the probe comprises a cylinder positioned on said base, a piston slidably received within said cylinder and having a piston rod extending from one end thereof, a spring within said cylinder to urge said piston upwardly, means for connecting said piston rod with said probe supporting means, an aperture in said cylinder at an end spaced from and below said piston and on the side of the piston opposite the side from which the piston rod extends, and means for varying the flow area of said aperture, whereby to control the rate of air flow through said aperture and thereby control the rate of descent of said probe.

8. The coating thickness measurement device of claim 1 wherein said base carries a pair of vertically spaced, horizontally movable slide members, the horizontal movement directions of which are mutually perpendicular, one of said slide members including means for holding a part to be measured.

9. The coating thickness measurement device of claim 1 wherein said device includes calibration means for holding and presenting calibration specimens having known thicknesses.

10. The coating thickness measurement device of claim 9 wherein said calibration means includes a pivotable arm having a receptacle for receiving a calibration standard, said arm being pivotable from a first, non-calibrating position to a second, calibration position in which the receptacle is in underlying relationship to said probe.

11. The coating thickness measurement device of claim 10 wherein said arm carries means for restraining it in its calibration position.

12. The coating thickness measurement device of claim 11 wherein said arm carries means for restraining it in its non-calibrating position.

13. The coating thickness measurement device of claim 11 or 12 wherein said restraining means comprises at least one magnet carried by said arm and at least one cooperating, magnetically permeable member carried by said housing.

14. An apparatus for accurately and repeatably measuring the coating thickness of extremely small identical parts, said apparatus comprising:
   a base;
   a part positioning fixture capable of readily receiving at a predetermined location on said fixture one of a plurality of identical parts, each one of said parts having a coating at a specific location, the thickness of which is to be measured;
   holding means mounting said fixture on said base in such a manner that the fixture can be adjusted with respect to the base to position the specific location of the part in a prescribed locus relative to said base; and
   supporting means mounted on said base capable of initially supporting indicia means which are able to establish said prescribed locus whereby the fixture can be adjusted to position the specific location of said part in said prescribed locus, and of subsequently supporting a measuring probe capable of measuring the thickness of the coating on the part at said specific location.

15. The apparatus as set forth in claim 14 wherein said measuring probe is provided with a surface having an aperture, and wherein the supporting means mounts said probe for movement between an inoperative position where the surface is spaced away from the specific location and an operative position where the surface about the aperture is in contact with the part about the specific location of the part.

16. An apparatus for accurately and repeatably measuring the coating thickness of extremely small identical parts, said apparatus comprising:
   a base;
   a part positioning fixture capable of readily receiving at a predetermined location on said fixture one of a plurality of identical parts, each one of said parts having a coating at a specific location, the thickness of which is to be measured;
   holding means capable of holding the fixture on the base in various positions of adjustment;
   a probe provided with a radiation source and a radiation detector and having a surface provided with an aperture through which radiation can pass, said surface being capable of being brought into an operative position where said surface is in contact with the part about the specific location which is to be measured;
   supporting mean mounting said probe for movement between an inoperative position where said surface of the probe is spaced away from said specific location and said operative position; and
   indicia means capable of indicating where the aperture will be located when the probe is in its operative position whereby the fixture may be adjusted to bring said specific location adjacent said location of the aperture when it is in its operative position.

17. The apparatus as set forth in either claim 14 or claim 16 wherein the indicia means is a microscope provided with cross hairs.

18. The apparatus as set forth in either claim 16 or 15 in which the inoperative position is spaced above the operative position, and further characterized by the provision of moving means which are capable of moving the probe between a lowered operative position and a raised inoperative position and further being capable of permitting the probe to descend from the raised inoperative position to its lowered operative position.

19. The apparatus as set forth in claim 18 additionally characterized by the provision of means for controlling the rate of descent of said probe upon release from its raised inoperative position so that the impact force of said probe on the part is uniform from part to part when it attains its lowered operative position.

20. The apparatus as set forth in claim 18 in which said moving means includes a cam which is movable from a rest position to an operating position, said cam being adapted to raise said probe out of contact with the surface of the part to be measured and to selectively permit said probe to fall by means of gravity from a raised inoperative position to a lowered operative position wherein it is in contact with the part to be measured; and further characterized by means for controlling the rate of descent of said probe upon release from its raised position so that the impact force of said probe on the part is uniform from part to part when it attains its lowered operative position, said means for controlling the rate of descent comprising a cylinder positioned on said base, a piston slidably received within said cylinder and having a piston rod extending from one end thereof, a spring within said cylinder to urge said piston upwardly, means for connecting said piston rod with said probe supporting means, an aperture in said cylinder at an end spaced from and below said piston and on the side of the piston opposite the side from which the piston rod extends, and means for varying the flow area of said aperture whereby to control the rate of air flow through said aperture and thereby control the rate of descent of said probe.

21. A method of accurately and repeatably measuring the coating thickness of extremely small identical parts, said method comprising the following steps:
   (a) providing an apparatus including a base, a part positioning fixture, and a mount, the part positioning fixture being capable of readily receiving at a predetermined location on said fixture one of a plurality of identical parts having a coating thereon, said fixture being mounted on said base in such a manner that the fixture can be moved with respect to the base from a first position to a set position wherein a part in said predetermined location on said fixture is in a prescribed location relative to said base, and said mount being mounted on said base in alignment with said fixture, said mount being capable of receiving either a microscope provided with targeting indicia or a coating thickness measuring probe having an aperture through which radiation can pass, said mount being constructed in such a manner that the aperture of the probe will overlie the area indicated by the targeting indicia when the probe is supported by the mount in its operative position;
   (b) placing one of said identical parts onto said fixture;

(c) placing a microscope in said mount, said microscope being provided with targeting indicia;
(d) moving the mounted fixture with respect to said base, if necessary, to insure that the part on said fixture is in said set position as established by said targeting indicia
(e) removing said microscope from said mount;
(f) placing a measuring probe in said mount;
(g) lowering said probe into contact with the part on said fixture and taking a coating thickness measurement thereof;
(h) raising said probe;
(i) removing said part; and
(j) repeating steps (b), (g), (h), and (i) to measure additional identical small parts which are adapted to be received by said fixture.

22. The method as set forth in claim 21 further characterized by controlling the rate of descent of said probe when it is lowered into contact with the part on said fixture so that the impact force of said probe on the part is uniform from part to part when the prober attains its lowered position.

* * * * *